United States Patent [19]
Battocchio

[11] Patent Number: 5,674,332
[45] Date of Patent: Oct. 7, 1997

[54] METHOD OF ADJUSTING THE PRESSURE OF THE TIRES ON A VEHICLE

[75] Inventor: Claudio Battocchio, Almeria, Spain

[73] Assignee: Compagnie Generale des Etablissements Michelin —Michelin & Cie, Clermont-Ferrand, France

[21] Appl. No.: 464,696

[22] PCT Filed: Dec. 7, 1993

[86] PCT No.: PCT/EP93/03439

§ 371 Date: Jun. 7, 1995

§ 102(e) Date: Jun. 7, 1995

[87] PCT Pub. No.: WO94/13499

PCT Pub. Date: Jun. 23, 1994

[30] Foreign Application Priority Data

Dec. 11, 1992 [FR] France ................................. 92 15060

[51] Int. Cl.$^6$ ............................................ B60C 23/00
[52] U.S. Cl. .................................... 152/416; 364/424.03
[58] Field of Search ......................... 152/415, 416, 152/417; 364/558, 424.01, 424.03

[56] References Cited

U.S. PATENT DOCUMENTS

| | | | |
|---|---|---|---|
| 4,333,491 | 6/1982 | Knubley | 137/116.3 |
| 4,498,515 | 2/1985 | Holtzhauser et al. | 152/417 |
| 4,510,979 | 4/1985 | Hjorth-Hansen | 141/95 |
| 4,583,566 | 4/1986 | Kalavitz et al. | 152/416 X |
| 4,640,331 | 2/1987 | Braun et al. | 152/417 |
| 4,708,184 | 11/1987 | Pechar | 152/417 |
| 4,782,879 | 11/1988 | Le Chatelier et al. | 152/417 |
| 4,862,938 | 9/1989 | Mittal | 152/417 |
| 4,893,664 | 1/1990 | Oltean | 152/416 |
| 4,917,163 | 4/1990 | Schultz | 152/415 |
| 5,141,589 | 8/1992 | Mittal | 152/415 |
| 5,249,609 | 10/1993 | Walker et al. | 152/415 X |
| 5,313,995 | 5/1994 | Schultz | 152/416 |

FOREIGN PATENT DOCUMENTS

| 0352921 | 1/1990 | European Pat. Off. |
| 2826635 | 1/1980 | Germany |

*Primary Examiner*—Michael W. Ball
*Assistant Examiner*—Francis J. Lorin
*Attorney, Agent, or Firm*—Brumbaugh, Graves, Donohue & Raymond

[57] ABSTRACT

Method of adjusting the pressure of the tires on a vehicle equipped with a centralized inflating installation which successively connects up each tire to the compressed-air source via a line, a rotary seal and a differential-type isolating valve, then closes the compressed-air inlet after a very short time, and repeats these operations iteratively. According to the invention, a value of the set pressure corresponds to a value of the duration of the very short time.

5 Claims, 4 Drawing Sheets

METHOD OF ADJUSTING THE PRESSURE OF THE TIRES ON A VEHICLE

The subject of the present invention is a method of adjusting the pressure of the tires on a vehicle; more precisely, it relates to vehicles equipped with a centralized inflating installation which can operate even while the vehicle is being used, and it also makes it possible to avoid employing the normal inflating or deflating mode.

It is known that the optimum inflation pressure of tires depends on the conditions of use of the vehicle and especially the load, speed and nature of the ground. This is the reason why systems have been developed which are capable of modifying the pressure, even when running, so that it always has this optimum value; these systems include a source or reserve of compressed air installed on board the vehicle, lines connecting this source to the tires via rotary seals and a selector enabling the source to be connected up to each of the tires: Patents FR 884,598 and EP 297,837 may be mentioned.

The normal mode of operating these installations consists in periodically measuring the pressure of each tire and in correcting it, as the case may be, by inflating or deflating the tire in question.

When double-acting valves are used, such as the one described in Patent FR 884,598 for example, hereinafter called "isolating valve", it is possible to open the usual valve by means of a piston which acts on this valve and is actuated by compressed air; by virtue of the differential operation of this piston—which comprises two faces of different cross sections—it is possible to keep the usual valve open even if the control pressure is slightly less than the internal pressure of the tire.

In order to check the pressure of each tire, the compressed-air source is connected up, this having the effect of opening the usual valve, then, after a short time, the air supply line is isolated, this having the effect of equilibrating the pressure in the line to the tire pressure and thus enabling the pressure to be measured. Inflating or deflating is then carried out, if necessary. Finally, the line is vented to atmosphere, this having the effect of closing the isolating valve again.

SUMMARY OF THE INVENTION

Now, the applicant has surprisingly discovered that, whatever the initial pressure of a tire, if the checking operation is repeated a few times, connecting up the tire to the compressed-air source for very short times of equal durations $t_i$, the pressure finally tends towards a value $p_i$ which depends only on this duration $t_i$ and on the pressure of the compressed-air reserve, but absolutely not on the initial pressure of the tire before the pressure checks. In other words, there corresponds to a pulse duration $t_i$ a constant difference between the pressure prevailing in the compressed-air source and the asymptotic value of the pressure in the tire. Therefore, if the pressure in the compressed-air source is constant, the pressure (asymptotic value) of the tire depends only on $t_i$.

In accordance with the invention, a method of adjusting the pressure of the tires on a vehicle equipped with a centralized inflating installation which includes a compressed-air source, a selector and lines, a rotary seal as well as an isolating valve between the selector and each tire, said method including, successively for each tire, the following steps controlled by the selector: connecting the compressed-air source to the tire via the line and rotary seal associated with the respective tire, this having the effect of opening the isolating valve, after a very short time closing the compressed-air inlet to the line, then measuring the pressure in the line which has become the same as the pressure in the tire, and then venting said line to atmosphere, this having the effect of closing the isolating valve again, is characterized in that the duration of said very short time is determined as a function of the set pressure to be obtained in the tire in question, and in that the operation is repeated at least until said set pressure has been obtained.

This iterative type of operating mode may advantageously be repeated continually while using the vehicle, since the pressure, once obtained, stays permanently maintained.

Of course, this iterative mode does not exclude the other modes of operating a centralized reflating installation; for example, if the driver wishes to increase the set pressure by a large amount, he can use the normal inflating mode or an intermediate mode, proceeding by successive variations, before finally adjusting the new pressure in accordance with the invention. Thus, for example, the duration of said very short time is adjusted as a function of the set pressure only when the measured pressure has a value close to the set pressure. In that case, even if the pressure has exceeded the set value, by virtue of the invention, it will eventually return to it.

In an advantageous variant of the invention, the pressure adjustment operations are performed sequentially on all or some of the tires, for example the tires of the towing part and then those of the trailer. By this is meant that each successive pressure check, which may have the effect according to the invention of slightly modifying the inflation pressure of the tire in question, relates to a different tire on the vehicle. The inflation pressures of all the tires treated sequentially therefore change very progressively and in an overall simultaneous manner.

According to another embodiment of the invention, the spare wheel tire may be used as compressed-air reserve.

The method of adjusting the pressure according to the invention affords substantial advantages: firstly it enables the pressure in the various tires on a vehicle to be adjusted in a continual, progressive and balanced manner. This greatly improves both safety and comfort, since it could be dangerous to momentarily modify the balance of the pressures between the tires on the same axle or between the front and rear of a vehicle.

Moreover, when a tire is deflated or reinflated and when the difference between the initial pressure and the final pressure is large, it happens that the rotary seals located between the isolating valve of each tire and the compressed-air tank (which are therefore subjected to a pressure close, depending on the case, to that of the tires or to that of the compressed air) heat up dangerously because they remain stressed by the pressure for too long a time. This is particularly critical in the case of heavy trucks, where the inflation pressure is of the order of 8 or 9 bars, and large-diameter seals. The invention prevents or considerably reduces the heat-up of the rotary seals, since these are now stressed only discontinuously, that is to say they now are subjected only to brief and repeated stressing, which is less damaging. This increases their lifetime and reduces the cost of maintenance; finally it is possible to simplify and to lighten the on-board installation, and consequently to increase the useful load of the vehicle.

DESCRIPTION OF THE DRAWINGS

An embodiment of the invention will now be described, given by way of non-limitating example, referring to the appended drawing in which.

DESCRIPTION OF PREFERRED EMBODIMENTS

Figure 1:
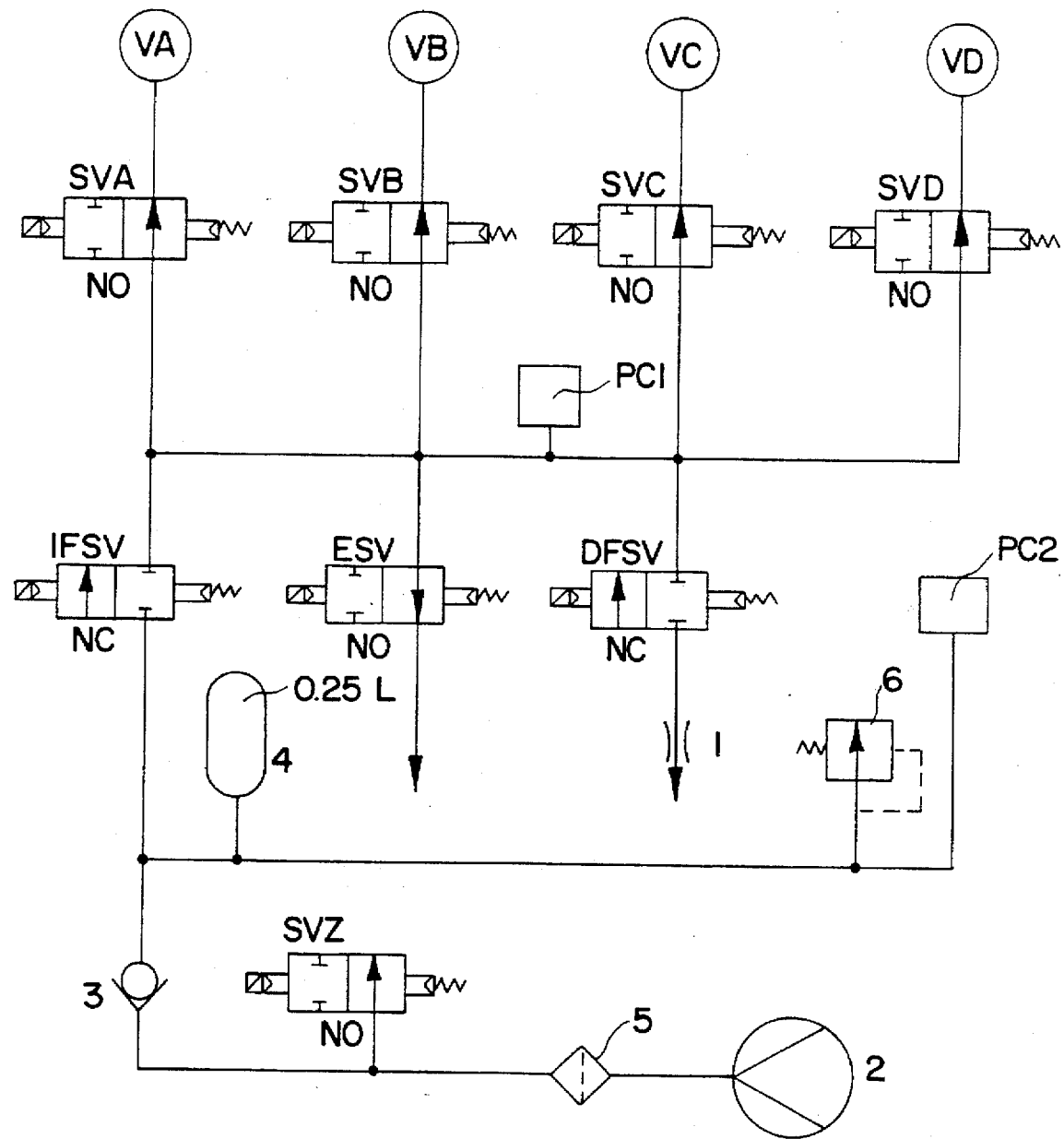
FIG. 1 is a block diagram of an installation for a light vehicle.

FIG. 1 shows the four isolating valves VA, VB, VC and VD of the four tires (not depicted) fitted on a light vehicle. These isolating valves of the bidirectional type, or having differential control, like the ones described in the already mentioned Patent FR 884,598, are actuated by the normally-open solenoid valves SVA, SVB, SVC and SVD. In order to simplify the diagram, the layout of the lines on the vehicle, as well as the presence of rotary seals between the isolating valves VA, VB, VC, VD and the solenoid valves SVA, SVB, SVC, SVD have not been depicted.

The four lines are connected to a common trunk line to which are also connected the normally-closed inflating solenoid valve IFSV and deflating solenoid valve DFSV, the normally-open exhausting-to-atmosphere solenoid valve ESV and a pressure checker PC1.

The deflating solenoid valve DFSV opens under a calibrated leak 1, while the inflating solenoid valve IFSV is connected, on the one hand, to the compressed-air source/compressor 2, nonreturn valve 3, and solenoid valve SVZ for venting to free air and, on the other hand, to a compressed-air reserve 4 (a quarter of a liter at 5 bars, for example). A filter 5 is connected to the discharge of the compressor. The system is also provided with a pressure checker PC2 and safety valve 6.

The known normal operating cycles are as follows:

inflation of the tire A: SVA open; SVB, SVC and SVD closed; ESV and DFSV closed; IFSV open.

deflation of the tire A: SVA open; SVB, SVC and SVD closed; ESV closed, IFSV open for a fraction of a second (in order to open the isolating valve VA), DFSV open.

checking the pressure of the tire A: SVA open; SVB, SVC and SVD closed; ESV closed; IFSV open for a fraction of a second (in order to open the isolating valve VA); DFSV closed; then ESV opened.

According to the invention, it is this latter sequence (pressure check) which is successively and sequentially repeated for the four tires A, B, C, D, A, B, C, D, A, etc., with an IFSV open time $t_i$ which is determined according to the set pressure fixed for each tire.

A complete cycle, that is to say an action on each of the four tires, may be performed in four seconds with IFSV open times of a tenth of a second each time (and therefore the same set pressure for the four tires in this example). We point out that the set pressure $p_i$ depends only on $t_i$ if the pressure of the compressed-air source remains constant, which is assumed to be the case.

Figure 2:
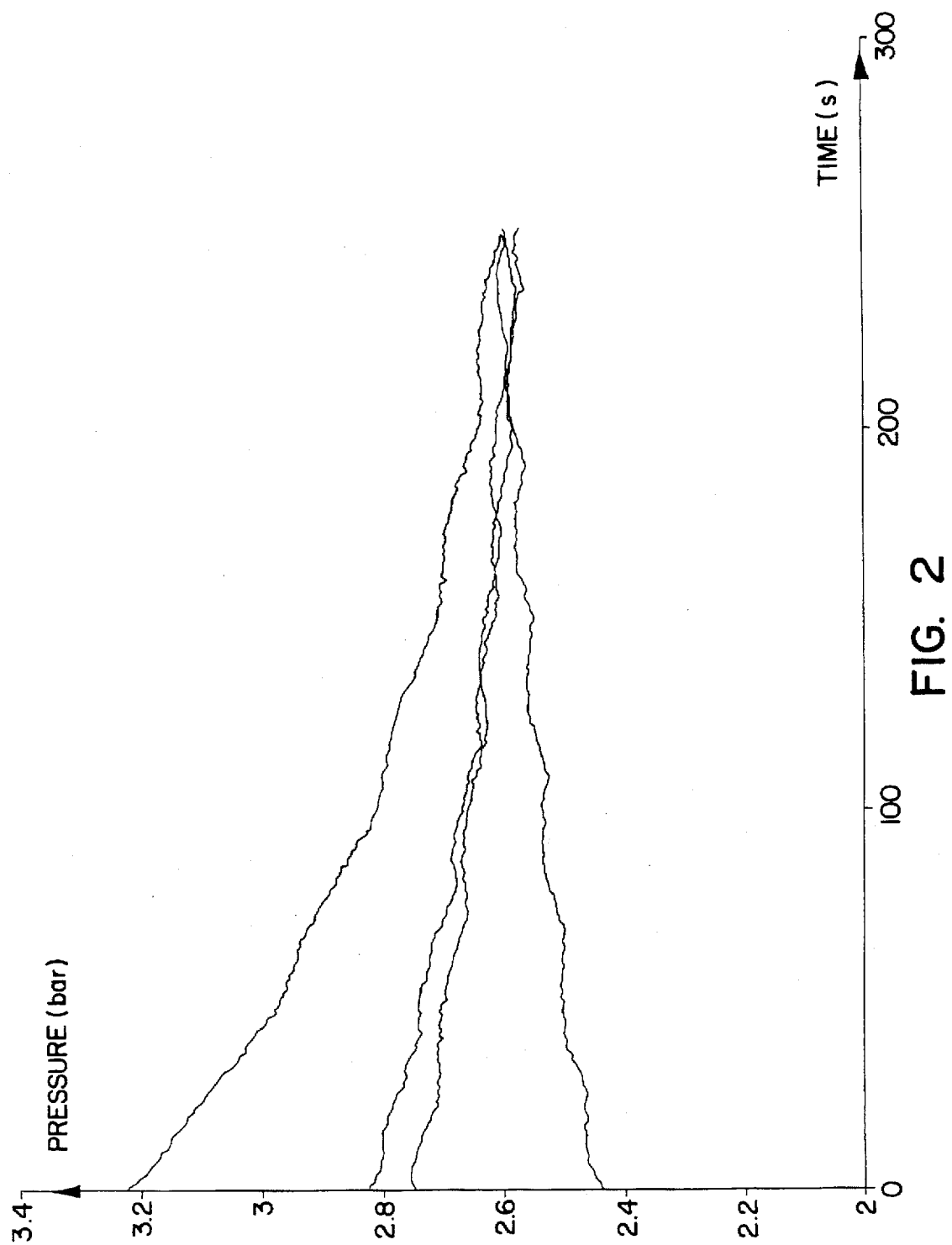
FIG. 2 and FIG. 3 are plots of measurements which illustrate the principle of the invention.

FIG. 2 shows plots of pressure measurement made on a tire of size 225/50 ZR 16, initially inflated to 2.4 bars, then 2.7 bars, then 2.9 bar and finally 3.2 bar, to which the method of the invention is applied with pulses of constant duration ($t_i$=0.2 seconds); it is observed that, in all cases, the final pressure is the same, i.e. $P_f$=2.6 bars.

Figure 3:
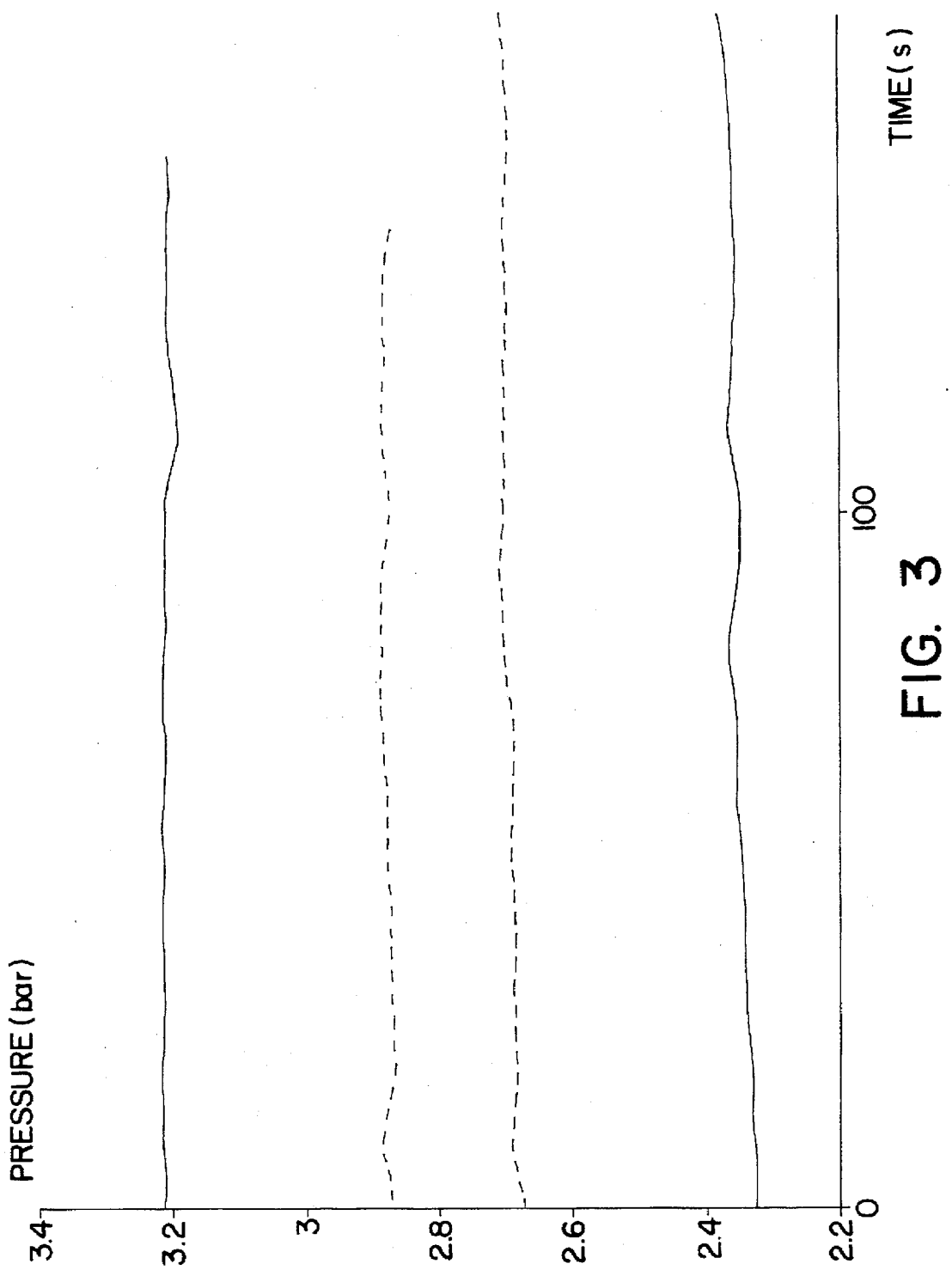

FIG. 3 illustrates the continuation of the procedure in the case where the pressure adjustment operations are repeated continually while the vehicle is being used: when a set pressure has been obtained by the method of the invention, it stays permanently maintained; here, there are four different set values (2.4-2.7-2.9 and 3.2 bars) corresponding to four well-defined durations of the very short time; 0.105-0.150-0.180 and 0.225 seconds.

Figure 4:
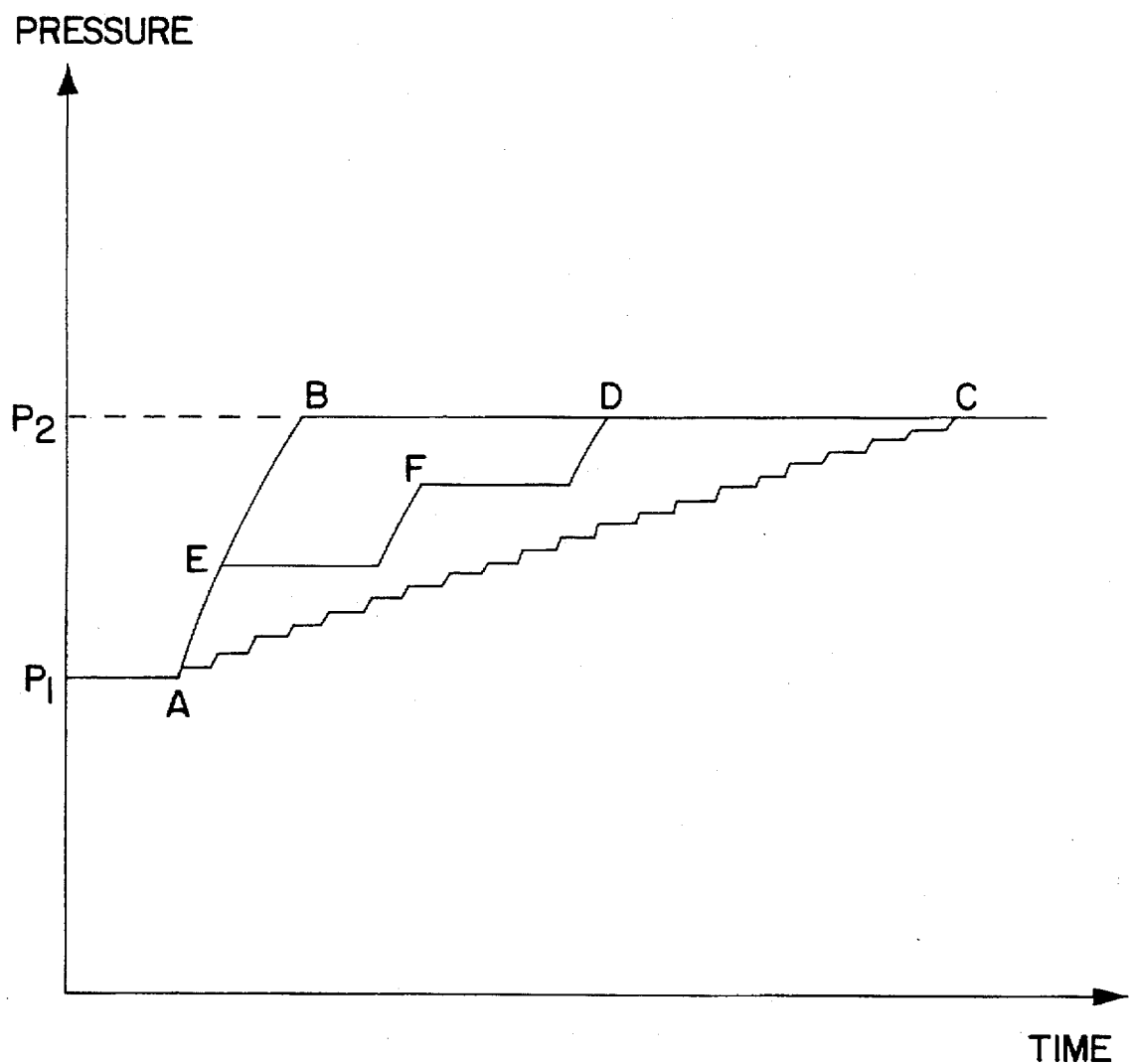
FIG. 4 is a diagram of the various modes of regulating the pressure.

Finally, FIG. 4 makes it possible to demonstrate the various ways of passing from a set value $P_1$ to a greater value P2: the normal inflating mode, AB, the iterative checking mode in accordance with the invention, AC, and an intermediate mode, AB, which may be called corrective/adaptive mode and which, here, proceeds by three successive variations, AE, EF and FD. It is possible to use the AB or AE-EF-FD modes when the difference between the set pressure and the measured pressure is too large, greater than a chosen value.

To summarize, when the tire is connected up to the compressed-air source for a very short time of duration $t_i$, the isolating valve opens and a small quantity of air $q_E$ enters the tire; conversely, when the line is vented to atmosphere and the isolating valve closes again, a small quantity of air $q_L$ leaves the tire; if the two quantities $q_E$ and $q_L$ are equal, the pressure of the tire does not change; we consider that this pressure is equal to $P_i$. The surprising effect is that, if the instantaneous pressure is different from $P_i$, for example if it is less than $P_i$, and the constant duration $t_i$ is maintained, $q_E$ becomes greater than $q_L$ and the pressure in the tire will increase at each operation until it reaches the pressure $P_i$ which depends only on $t_i$, and it will consequently no longer vary, even if the checking operations are continued.

I claim:

1. A method of adjusting the pressure of the tires on a vehicle equipped with a centralized inflating installation which includes a compressed-air source, a selector and lines, a rotary seal and an isolating valve between the selector and each tire, said method including, successively for each tire, the following steps controlled by the selector: connecting the compressed-air source to the tire via the line and rotary seal associated with the respective tire, this having the effect of opening the isolating valve, after a very short time closing the compressed-air inlet to the line, then measuring the pressure in the line which has become the same as the pressure in the tire, and then venting said line to atmosphere, this having the effect of closing the isolating valve, characterized in that the duration of said very short time is determined as a function of the set pressure to be obtained in the tire in question, and in that the operation is repeated at least until said set pressure has been obtained.

2. Method of adjusting the pressure according to claim 1, characterized in that the pressure adjustment operations are repeated continually while the vehicle is being used.

3. Method of adjusting the pressure according to claim 1, characterized in that the duration of said very short time is adjusted as a function of the set pressure only when the measured pressure has a value close to the set pressure.

4. Method of adjusting the pressure according to claim 1, characterized in that the adjustment operations are performed sequentially on a plurality of tires.

5. Method of adjusting the pressure claim 1, characterized in that the spare wheel is used as compressed-air reserve.

* * * * *

UNITED STATES PATENT AND TRADEMARK OFFICE
CERTIFICATE OF CORRECTION

PATENT NO. : 5,674,332
DATED : Oct. 7, 1997
INVENTOR(S) : Battocchio

It is certified that error appears in the above-indentified patent and that said Letters Patent is hereby corrected as shown below:

<u>Col. 4, line 61</u>, "claim 1" should read --according to claim 1--.

Signed and Sealed this

Fifth Day of May, 1998

Attest:

BRUCE LEHMAN

*Attesting Officer*     *Commissioner of Patents and Trademarks*